United States Patent [19]

Kyriakides et al.

[11] 4,364,692
[45] Dec. 21, 1982

[54] BUCKLE ARRESTOR FOR PIPE USING CLOSELY SPACED TURNS OF ROD TO FORM A COIL

[75] Inventors: Stelios Kyriakides, Pasadena; Charles D. Babcock, Altadena, both of Calif.

[73] Assignee: California Institute of Technology, Pasadena, Calif.

[21] Appl. No.: 107,325

[22] Filed: Dec. 26, 1979

[51] Int. Cl.³ ............................................. F16L 1/00
[52] U.S. Cl. ................................ 405/168; 138/172; 405/166; 405/169
[58] Field of Search ................................ 450/154–166, 450/167–172; 138/172

[56] References Cited

U.S. PATENT DOCUMENTS

| | | | |
|---|---|---|---|
| 2,145,244 | 1/1939 | Berg et al. | 138/172 UX |
| 2,147,494 | 2/1939 | Miller | 138/172 |
| 2,410,753 | 11/1946 | Shinomiya | 138/172 X |
| 2,425,800 | 8/1947 | Hamilton | 138/172 X |
| 3,141,480 | 7/1964 | Ralston | 138/172 |
| 3,349,807 | 10/1967 | Penman | 138/172 |
| 3,747,356 | 7/1973 | Lochridge et al. | 138/172 X |
| 3,768,269 | 10/1973 | Broussard et al. | 405/168 |
| 4,113,132 | 9/1978 | Steiner | 138/172 X |

*Primary Examiner*—Dennis L. Taylor
*Attorney, Agent, or Firm*—Freilich, Hornbaker, Wasserman, Rosen & Fernandez

[57] ABSTRACT

A flexible buckle arrestor (20) is provided at somewhat regular intervals (l) along the length of a pipeline (10) as it is being laid underwater for arresting the propagation of any buckle (22) that may occur in the pipeline during or after pipeline laying operations. The buckle arrestor is comprised of a rod (20a) tightly wound around the pipe to form a number of spaced apart turns, the ends (20a and 20b) of which are secured either to the rod itself, to the pipe, or to the rod and pipe to prevent the turns from expanding while a buckle propagating in the pipe is arrested. The turns may be individual and unconnected, with each turn welded to itself, to the pipe, or itself and the pipe. The rod may be wound on the pipe as it is being payed out from a reel, or may be wound on the pipe before it is placed on the pipe laying vessel, particularly when a concrete coating (24) is applied to sections welded together as the pipe is laid. The flexibility of the arrestors thus formed at regular intervals will allow the pipe to conform to natural bends as it is laid.

8 Claims, 13 Drawing Figures

BUCKLE ARRESTOR FOR PIPE USING CLOSELY SPACED TURNS OF ROD TO FORM A COIL

BACKGROUND OF THE INVENTION

This invention relates to laying a pipeline on the floor of a deep body of water, and more particularly to a method for arresting the propagation of any buckle in the pipeline that may occur while it is being laid or at any time thereafter.

During underwater pipelaying operations, a continuous length of pipe is payed out from a vessel into the water. The pipeline naturally bends and sometimes, either close to the vessel or in the sag bend, the buckling limit of the pipe can be exceeded, causing local buckling. Local buckling or plastic deformation of the pipe can also occur after the laying operation is completed due to falling objects (anchors or other heavy equipment) or natural causes such as earthquakes, sea bottom instabilities and undue currents.

When buckling occurs at any point in the pipeline, the collapse at that point may propagate along the pipeline for great distances in both directions due to hydrostatic pressure. It is desirable to prevent the propagation of a buckle over too large a section in order to minimize the length of pipe that must then be replaced. One method of arresting a buckle is disclosed in U.S. Pat. No. 3,747,356. The technique described there is to place a cylinder inside the pipe tethered to a cable payed out with the pipeline to allow the cylinder to remain in a section of pipe until that section reaches the floor. The cable length is then fixed so that an additional pipe is payed out, the cylinder is pulled along through the inside of the pipe. Any buckle that may occur in the pipeline between the vessel and the floor is thus immediately arrested and not allowed to propagate along the pipeline already resting on the floor. The problem with this technique is that it will not prevent a buckle that may occur in the pipeline, after it is laid, from propagating along the floor.

One could place hollow cylinders inside the pipeline as buckle arrestors at selected intervals, and leave the cylinders in place, but that would reduce the effective internal diameter of the pipeline. It would be possible to place permanent cylinders or sleeves outside the pipe at regular intervals as described by U.S. Pat. No. 3,768,269, to simply increase the section modulus of the pipeline for restricted lengths at intermittent intervals. It should be noted that the first (internal) method has been shown to be more efficient than the second because the hydrostatic pressure acts only on the pipe and not on the arrestor, whereas in the second (external) method the hydrostatic pressure acts on the arrestor itself.

Both of these arresting devices have the disadvantage that they cannot be used in the case of a continuous pipelaying process, such as one where the pipe is laid from a shipboard reel onto which the pipeline has been prewound. This is because no end exists through which the sleeves could be inserted or over which the sleeves could be slipped. Another disadvantage with these arrestors is that, due to their construction, they increase the bending rigidity of the pipe so that, at the ends of these sleeves or heavier sections, excessive local stresses are apt to occur due to the discontinuity in thickness, which can create problems.

SUMMARY OF THE INVENTION

An object of this invention is to provide a buckle arrestor that can be left in place as a submarine pipeline is laid in order to provide continuous protection to the pipe even after the pipeline has been laid.

Another object is to restrict as much as possible the discontinuity stress concentrations during the laying operation by providing a device that can follow the natural bending arc of the pipeline in all positions.

Still another objective is to provide an arrestor that may be easily placed on a continuous pipeline payed out from a reel during the pipelaying operation.

These and other objects of the invention are achieved by a buckle arrestor for an underwater pipeline formed with a rod tightly wound around a pipe to form a number of spaced apart turns, the ends of which are secured, as by welding, either to the rod itself, to the pipe, or the rod and pipe to prevent the turns from expanding while a buckle propagating in the pipe is arrested. The turns may be individual and unconnected, or they may be in the form of a continuously wound coil. The arrestors thus formed at regular intervals along the pipe as it is being laid will arrest propagation of a buckle, but at the same time they will allow the pipe in the arrestor to conform to natural bends in the section of pipe as it is laid. In the process of laying the pipeline, the pipe may be payed out from a reel as the buckle arrestors are applied since the buckle arrestors are not preformed like a sleeve to be slipped over the pipe, but rather are formed on the pipe. Alternatively, the buckle arrestors may be applied before the pipe is wound on a reel, or before the pipe is placed on the vessel in straight sections to be welded into a continuous pipe as it is laid, particularly when a concrete coating is applied to help sink the pipe, or some other coating is applied to prevent pipe corrosion, although in the latter case the buckle arrestor may be wound from coated rod stock as the pipe is being payed out. The welds used to secure the coil should also be coated with rust preventing material.

The novel features that are considered characteristic of this invention are set forth with particularity in the appended claims. The invention will best be understood from the following description when read in connection with the accompanying drawings.

DETAILED DESCRIPTION OF PREFERRED EMBODIMENTS

Figure 1:
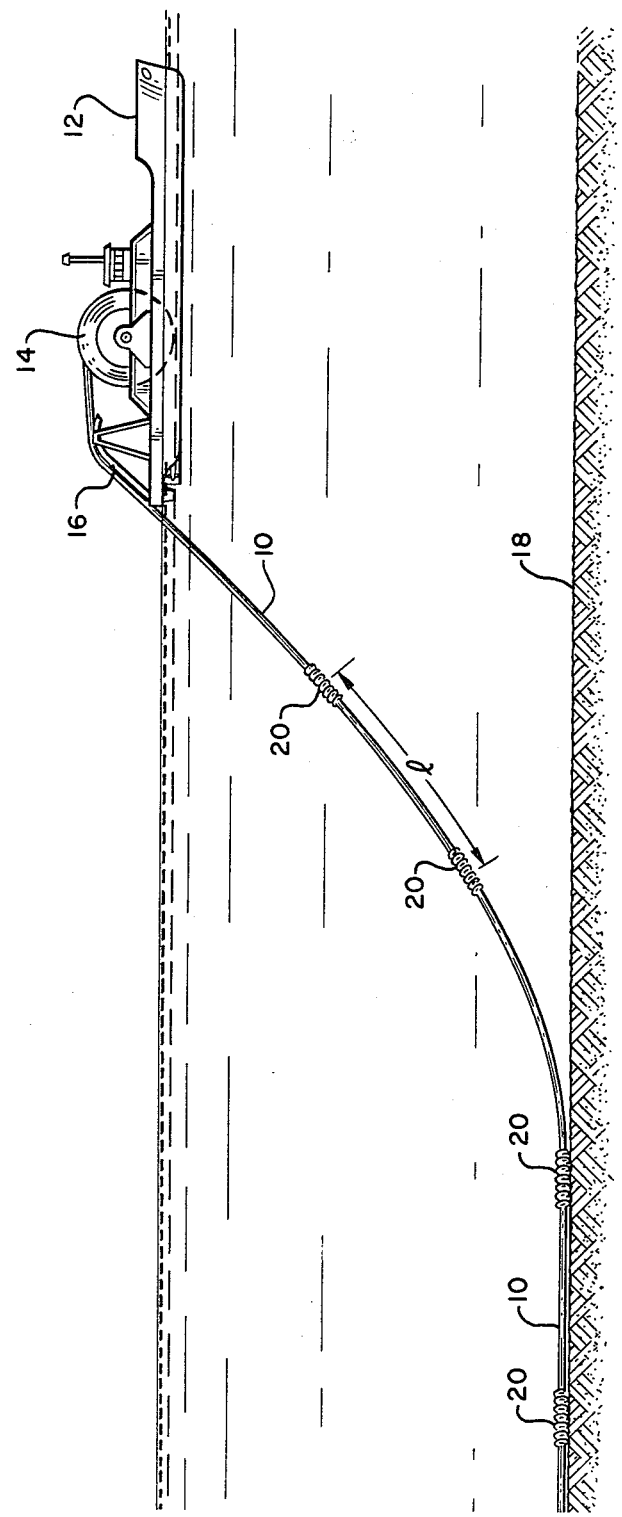
FIG. 1 illustrates schematically a vessel laying pipe from a coil with buckle arrestors applied in accordance with the present invention.

Referring to FIG. 1, an underwater pipeline 10 is being installed at an offshore location using a pipe laying vessel 12, which may be towed or self-propelled. This particular vessel is equipped for a continuous laying process by having a length of pipe prewound on a reel 14. The vessel is equipped with means (not shown) by which the pipe is payed out into the ocean. Among the equipment is a stinger 16 which usually embodies tensioning and reverse bending devices (the latter only if necessary to remove any bends in the pipe resulting from it having been wound on the reel). As the vessel 12 moves forward, the pipe 10 is fed into the water and onto the ocean floor 18. Sudden loss of tension or movements of the vessel 12, can cause a propagating buckle to be initiated in the pipe anywhere between the ocean floor and the vessel. A propagating buckle may even be initiated after the pipe comes to rest on the ocean floor. The most common cause there is dropping an anchor or heavy equipment on the pipe.

A propagating buckle will continue propagating as long as the external pressure on the pipe is greater than a value given by the following equation:

$$P_p \simeq 34 \, \sigma_o \left(\frac{t}{D}\right)^{2.5} \tag{1}$$

where
$\sigma_o$ is the yield stress of the pipe material,
t is the pipe wall thickness, and
D is the pipe diameter.

This value of pressure is characteristic of the pipe and is called the propagation pressure. If the buckle is not arrested, it will continue propagating until it reaches a region with pressure lower than the one given by equation (1). This could mean destruction of the whole pipeline, but it is now becoming common practice to provide propagating buckle arrestors 20 at somewhat regular intervals of length, l, along the pipeline. In such a case, the maximum possible damage to the pipe is restricted to the length of pipe between two arrestors. The exact value of l is not critical. It is a design choice that should take into consideration the following factors:

(a) The total length of the pipeline.
(b) The diameter and thickness of the pipe.
(c) The water depth.
(d) The cost of installation of a unit length of the pipeline.
(e) The cost of retraction and replacement of a unit length of damaged pipeline.

Figure 2A:
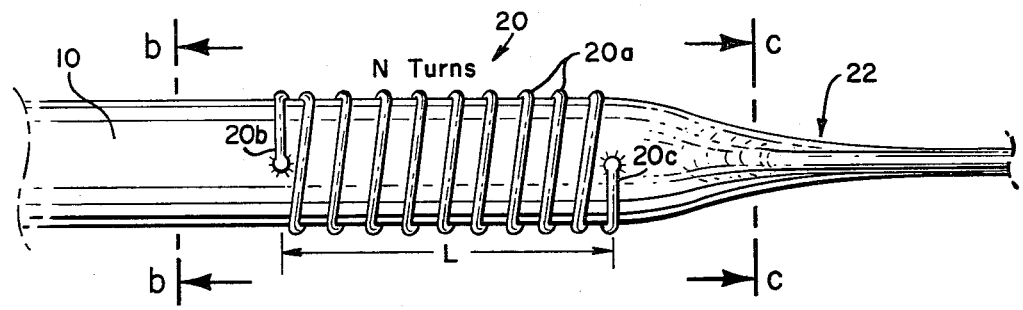
FIG. 2a illustrates a buckled section of pipe with the buckle arrestor of the present invention wound around it.
Figure 2B:
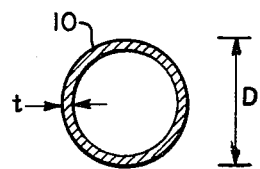
FIG. 2b illustrates a cross section of the pipe along a line b—b.
Figure 2C:
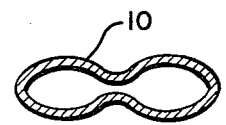
FIG. 2c illustrates a cross section of the pipe along a line c—c.

FIG. 2a illustrates a buckle 22 propagating from right to left. It is arrested by a buckle arrestor 20 in accordance with the present invention. On encountering the arrestor, the propagating buckle is stopped. Originally, the pipe has a circular cross section, as shown in FIG. 2b. The collapsed part of the pipeline assumes a dogbone type of cross section as shown in FIG. 2c, (or a quarter moon cross section when the wall collapses from one side to the other). The cross section of the part of the pipe downstream of the arrestor (to the left in FIG. 2a) remains circular.

The arrestors can be installed on the pipe 10 in a number of ways.

Figure 3:
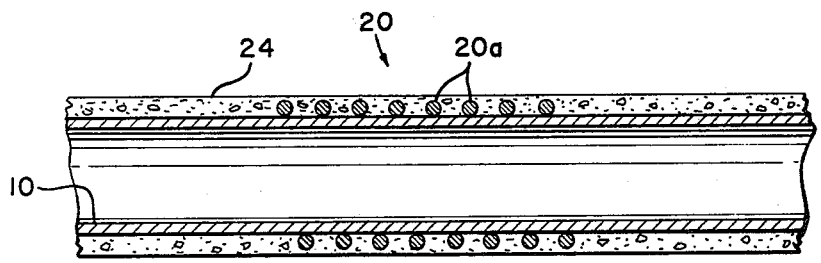
FIG. 3 illustrates in a longitudinal cross section the use of this arrestor with concrete coating.

(a) The arrestors can be installed before the pipe is wound on reels.
(b) The arrestors can be installed during the laying operation before or after the tensioner (not shown) in the vessel.
(c) In the case where a vessel with no reel is used, and the pipe is in sections which are welded to each other on the vessel, one out of every few or more sections can have the arrestor wound on it.
(d) In many cases the pipe 10 has to be coated with concrete in order to satisfy the necessary buoyancy requirements, in which cases the arrestor 20 can be placed on the pipe before a concrete coating 24 is applied over the arrestor 20 as shown in FIG. 3. In this manner an even outside diameter is preserved along the entire pipe, which can sometimes be important for proper operation of the tensioner used on the vessel while the pipe is being laid.

Figure 4:
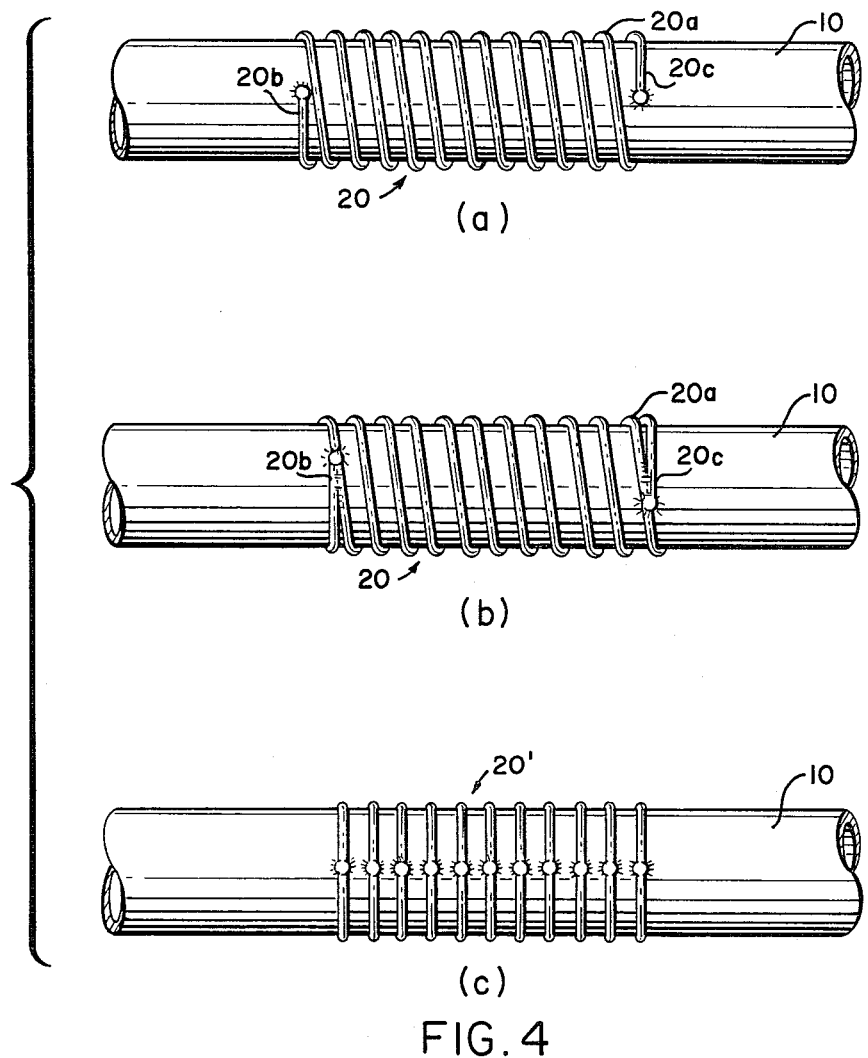
FIGS. 4a, 4b and 4c illustrate different ways in which the buckle arrestor of the present invention can be applied to a section of continuous pipe.

FIGS. 4a and 4b illustrate two spiral forms of the arrestor 20 installation. The spiral arrestor consists of a metal rod 20a wound tightly a number of times around the pipe 10. The end 20b and 20c of the arrestor can be welded to the pipe 10 as in FIG. 4a or to the first and last complete turn of the arrestor as shown in FIG. 4b, or both to the first and last turn and to the pipe, which may also be as represented by FIG. 4b. FIG. 4c illustrates an arrestor 20' that is a variation of the arrestor shown in FIG. 4b. In this variation, each turn of the arrestor may be individual and unconnected, with each turn welded to itself, to the pipe, or to itself and the pipe. About the same number of turns are used for each arrestor as in the spiral wound arrestors of FIGS. 4a and 4b.

From experiments carried out on model pipes it was found that the arrestor efficiency was not dependent on the method of welding the ends. However, welding the ends to the pipe makes the possibility of the buckle breaking the weld greater, so it is preferable to weld the ends to the rod or to both the pipe and the rod.

The cross section of the rod used for the arrestor should be selected with consideration to the following:
(a) It should maximize the second moment of area of the cross section of the arrestor about an axis parallel to that of the pipe.
(b) It should not present any problems during winding.
(c) It should be easy to manufacture and preferably readily available in the market.

Figure 5:
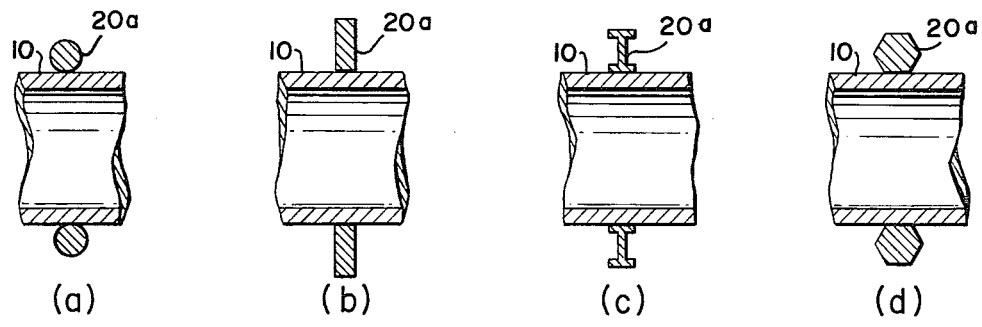
FIGS. 5a through 5d show various possible cross-sectional configurations for the arrestor rods.

Some possible cross sections are shown in FIG. 5.
(a) Circular cross section.
(b) Rectangular cross section.
(c) I beam cross section.
(d) Hexagonal cross section.

Figure 6:
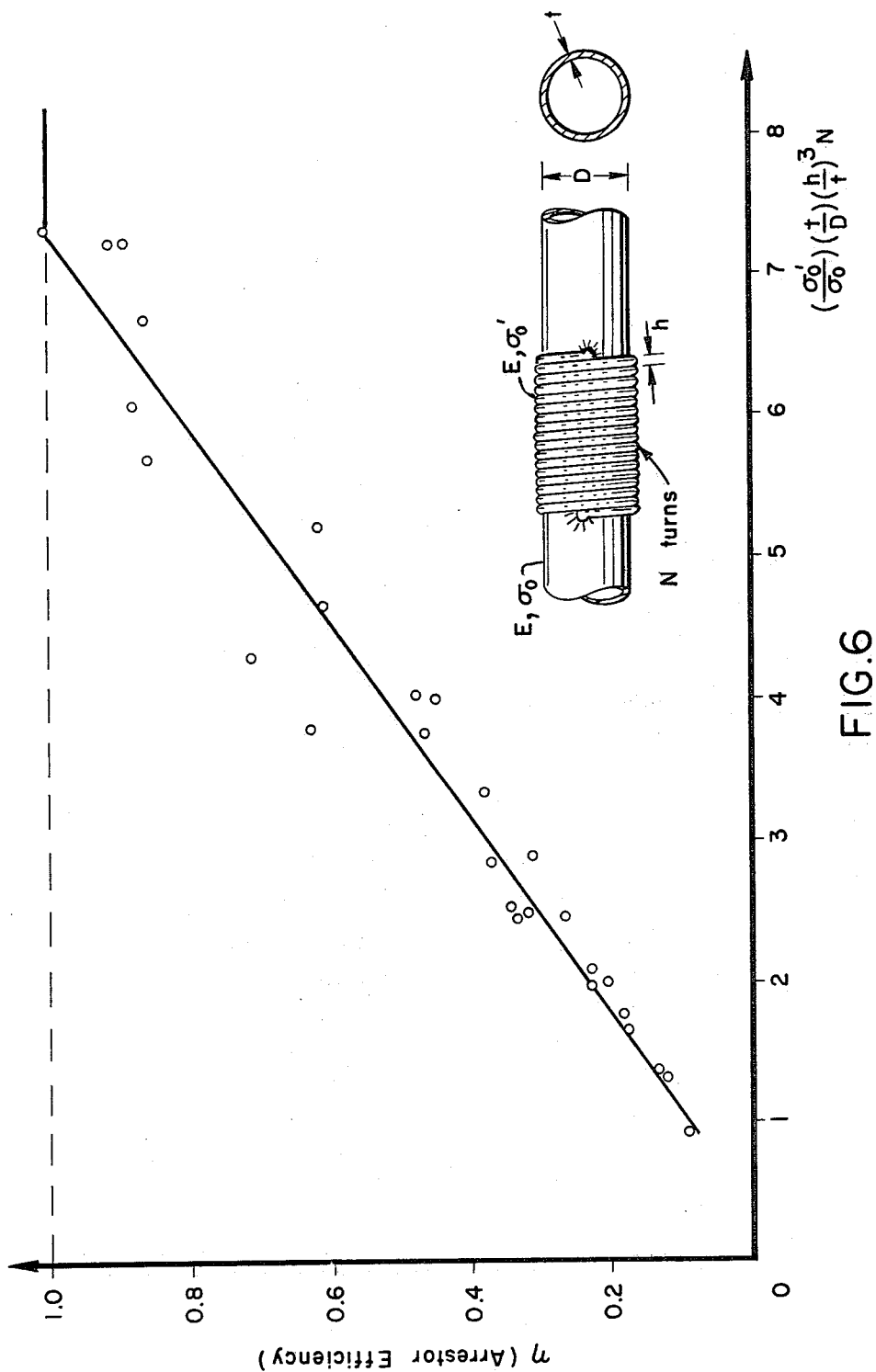
FIG. 6 shows various parameters which are involved in the problem of studying the behavior of an arrestor made in accordance with the present invention, and also shows in a graph the arrestor efficiency plotted vs the arrestor and pipe parameters.

Of these, the circular cross section is considered the easiest and most economical to use. It was therefore chosen to carry out a series of experiments to verify the effectiveness of the arrestor and obtain some design specifications. FIG. 6 shows the various parameters of the problem.

The pipe is characterized by two critical pressures. The first is the propagation pressure ($P_p$). This is defined as the lowest pressure at which an initiated buckle will propagate. An empirically derived expression for this pressure is given by equation 1. The second is the buckling pressure ($P_c$). This is the pressure at which a long pipe under external pressure becomes unstable (buckles). A classical expression for this pressure is:

$$P_c = \frac{2E}{(1-\nu^2)}\left(\frac{t}{D}\right)^3 \quad (2)$$

where $\nu$ = Pipe material Poissone ratio

E = Young's modulus of pipe

The combined assembly of the pipe and the arrestor is characterized by one critical pressure referred to as the crossover pressure ($P_o$). This is defined as the pressure at which a propagating buckle penetrates the arrestor and continues propagating.

An arrestor efficiency ($\eta$) is defined and will be used as a basis for comparing the merits of various arrestor designs; it is given by the following equation:

$$\eta = \frac{P_o/P_p - 1}{P_c/P_p - 1} \quad (3)$$

clearly an arrestor which allows a buckle, propagating at pressure $P_p$, to go through has an efficiency of zero. On the other hand, one that has a crossover pressure equal to $P_c$ has an efficiency of 1.

If the study is restricted to the quasi-static problem then all inertial parameters can be neglected, which simplifies the problem. The crossover pressure can then be expressed as:

$$\frac{P_o}{P_p} = f\left(\frac{E}{\sigma_o}, \frac{\sigma'_o}{\sigma_o}, \frac{D}{t}, \frac{h}{t}, \frac{L}{t}, N\right), \text{ and} \quad (4)$$

$$\eta = A_1 \left(\frac{E}{\sigma_o}\right)^{a_1} \left(\frac{\sigma'_o}{\sigma_o}\right)^{a_2} \left(\frac{D}{t}\right)^{a_3} \left(\frac{L}{t}\right)^{a_4} (N)^{a_5} \left(\frac{h}{t}\right)^{a_6} / \left[\frac{P_c}{P_p} - 1\right] \quad (5)$$

where:

E = Young's modulus of pipe and arrestor materials $\tau_o$ = Pipe material yield stress $\sigma'_o$ = Arrestor material yield stress L = Length covered by arrestor, as shown in FIG. 2a N = Number of turns of spiral arrestor D = Pipe diameter t = Pipe thickness h = Arrestor rod diameter In the experiments, the parametric dependence of the slip-on arrestor was studied. The slip-on arrestor is a single tight fitting ring slipped over the pipe. It is clear that replacing this by a number of rings, as in FIG. 4c, which is what the spiral arrestor is equivalent to, will not affect the dependence of the efficiency on $E/\sigma_o$, $\sigma_o/\sigma_o$ and D/t. Thus $a_1$, $a_2$ and $a_3$ are assigned the same values as those found from experiments with a slip-on arrestor.

A series of experiments were carried out to find the values of $a_4$, $a_5$ and $a_6$. This was done by varying one of the nondimensional parameters at a time, and finding the dependence of $\eta$ on that parameter.

In the first series of experiments all the parameters were kept constant and the spacing of the arrestor winding was varied. It was found that the closer the spiral winding is, the greater the efficiency. As a result, the arrestors were then wound with no spacing between them. With no spacing (L/t) can be ignored as it becomes a constant.

In the next experiment the number of turns in an arrestor was varied. The results obtained allowed us to calculate $a_5$ to be 1.

In another experiment the diameter of the arrestor rod was varied and $a_6$ was found to be 3.

All the experimental results are plotted on an efficiency vs. parameters plot and the constant of proportionality $A_1$ can be found from this plot. This concluded the parametric study of this arrestor.

As has been shown in the case of the slip-on arrestor, this quasi-static analysis more than suffices for the dynamic arrest case because it underestimates the arrestor efficiency under dynamic conditions.

It has also been shown that a gap between the arrestor and the pipe reduces the arrestor efficiency. Consequently, when winding the arrestor to the pipe, enough tension should be provided to the arrestor rod to assure virtually no gap on completion of the winding for highest efficiency.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A method for arresting the propagation of a buckle along an underwater pipeline comprising the steps of paying out a continuous pipe into the water from a vessel, tightly winding a metal rod around the pipe to form arrestors at intervals on the pipe as it is being laid, each arrestor consisting of a plurality of turns of said rod, and securing the ends of said rod in each arrestor to prevent the turns from expanding while a buckle propagating in the pipe is arrested, thereby to form flexible buckle arrestors which allow the pipe to conform to natural bends as it is laid.

2. A method as defined in claim 1 wherein each arrestor is formed from one continuous section of said rod wound in a spiral form.

3. A method as defined in claim 1 wherein the rod is cut after each turn with ends of the rod of each turn secured to prevent each turn from expanding.

4. A method as defined in claim 1 wherein each turn of said buckle arrestor is placed with no spacing between turns for maximum efficiency.

5. A method as defined in claim 1 wherein said buckle arrestor is placed on said pipe and coated with cement before it is laid.

6. Apparatus for arresting the propagation of a buckle along an underwater pipeline comprising a metal rod tightly wound a number of turns around the pipe of said pipeline at intervals to form at the end of each interval an arrestor having a number of turns, and means for securing the ends of said rod to prevent the turns of each arrestor from expanding while a buckle propagating in the pipe is arrested.

7. Apparatus as defined in claim 6 wherein said means for securing the ends of the rod is comprised of welds at the ends of the rod.

8. Apparatus as defined in claim 7 wherein said rod is cut after each turn of said coil, and the ends of the rod of each turn are secured.

* * * * *

UNITED STATES PATENT AND TRADEMARK OFFICE
CERTIFICATE OF CORRECTION

PATENT NO. : 4,364,692
DATED : December 21, 1982
INVENTOR(S) : Stelios Kyriakides & Charles D. Babcock It is certified that error appears in the above-identified patent and that said Letters Patent are hereby corrected as shown below:

On the title page:

Abstract, line 2, "1" should read -- $(\ell)$ --

Col. 3, lines 43 and 46, "1" should read -- $\ell$ --

Col. 5, line 40, "$\tau_o$" should read -- $\sigma_o$ --

Col. 5, line 53, "$\sigma_o/\sigma_o$" should read -- $\sigma_o'/\sigma_o$ --

Signed and Sealed this

Fifteenth Day of March 1983

[SEAL]

Attest:

GERALD J. MOSSINGHOFF

Attesting Officer

Commissioner of Patents and Trademarks